United States Patent
Kramer

(12) 
(10) Patent No.: US 6,425,370 B1
(45) Date of Patent: Jul. 30, 2002

(54) DIESEL ENGINE LOAD GOVERNING USING ENGINE SPEED SETPOINT

(75) Inventor: Thomas M. Kramer, Lombard, IL (US)

(73) Assignee: International Truck and Engine Corp., Warrenville, IL (US)

( * ) Notice: Subject to any disclaimer, the term of this patent is extended or adjusted under 35 U.S.C. 154(b) by 0 days.

(21) Appl. No.: 09/639,604

(22) Filed: Aug. 15, 2000

(51) Int. Cl.$^7$ ............................................... F02D 31/00
(52) U.S. Cl. ........................................................ 123/357
(58) Field of Search ......................................... 123/357

(56) References Cited

U.S. PATENT DOCUMENTS

| | | | |
|---|---|---|---|
| 5,553,589 A | * 9/1996 | Middleton et al. | 123/357 |
| 6,035,825 A | * 3/2000 | Worth et al. | 123/357 |
| 6,085,725 A | 7/2000 | Goode et al. | |
| 6,089,207 A | 7/2000 | Goode et al. | |
| 6,167,979 B1 | * 1/2001 | Taylor et al. | 123/357 |

OTHER PUBLICATIONS

Ray Amlung, Jeffrey P. Seger, Daniel D. Wilhelm & Tim Warlick "Electronics for engine control" Off–Highway Engineering Dec. 1996 pp. 45–48.

* cited by examiner

Primary Examiner—Thomas N. Moulis
(74) Attorney, Agent, or Firm—Dennis Kelly Sullivan; Gilberto Hernandez; Jeffrey P. Calfa

(57) ABSTRACT

A controller for, and method of, load governing a compression ignition engine. Various data is processed to develop fueling data for accomplishing governed fueling of the engine. The processing includes processing accelerator pedal position data corresponding to the position of an accelerator pedal and engine load data corresponding to the load on the engine to develop engine speed setpoint data according to a function generator containing engine speed setpoint data in correlation with accelerator pedal position data and engine load data to accomplish load governing of the engine in consequence of further processing of the developed engine speed setpoint data. The developed engine speed setpoint data and actual engine speed data are processed by a governor PID to develop the fueling data.

8 Claims, 5 Drawing Sheets

DIESEL ENGINE LOAD GOVERNING USING ENGINE SPEED SETPOINT

FIELD OF THE INVENTION

This invention relates generally to controllers for internal combustion engines, and in particular to a controller for a compression ignition engine.

BACKGROUND OF THE INVENTION

Larger motor vehicles such as heavy trucks and buses may be powered by diesel engines. Before the advent of electronic engine controls, such engines contained what may be generally considered as mechanical governors. Various types of engine governing can be performed by mechanical governors. One of those types is isochronous, or all-speed, governing.

Electronic governing of diesel engines has been made possible because of advances in electronic technology and fuel injection technology. Isochronous governing has been carried over in certain electronic governing strategies. It is believed that one reason for do so was because many professional drivers of larger diesel-powered motor vehicles had become accustomed to vehicles whose engines had mechanical governors operating with that strategy, and a change in strategy in a new vehicle might be foreign, and possibly unacceptable, to some of those drivers.

It is believed that diesel engines are also enjoying increased use in smaller vehicles such as medium trucks. It is further believed that automatic transmissions are being increasingly used in such vehicles. Drivers of such vehicles may be individuals who have little or no experience driving the larger vehicles, such as heavy trucks and buses, but they may be familiar with driving smaller vehicles which have gasoline engines and automatic transmissions. It is believed that such drivers will feel greater comfort in driving a diesel engine vehicle having an automatic transmission when such a vehicle operates in a manner similar to the smaller vehicles with which they may be familiar.

In such smaller vehicles moderate depression of the accelerator pedal results in part throttle operation that is effective to accelerate the vehicle through successive upshifts on a fairly level road until a desired speed is reached. On an uphill grade, greater depression of the accelerator pedal is needed to accelerate the vehicle through successive upshifts.

It has been observed that an automatic transmission vehicle powered by a diesel engine which is governed by isochronous, or all-speed, governing does not accelerate in the same manner as a smaller vehicle powered by a gasoline engine. The extent to which the driver depresses the accelerator pedal determines the speed to which the engine will accelerate. Isochronous governing causes the engine to be fueled in an amount sufficient to provide whatever torque is needed by the engine load, within the torque envelope for the engine, for the particular engine speed corresponding to the amount of accelerator pedal depression.

Because the torque converter of the automatic transmission is coupled to the engine output shaft, the state of the torque converter has an effect on the load which the vehicle drivetrain imposes on the engine. When the speed absorption ratio of the torque converter is zero, no propulsion torque is being transmitted through the torque converter to the drivetrain and hence the engine cannot propel the vehicle. Depressing the accelerator pedal will increase engine speed, and above some increased engine speed, the torque converter will begin to convert engine torque to drivetrain torque that will begin to accelerate the vehicle. As the vehicle accelerates, the speed of the torque converter output shaft begins to increase toward the torque converter input shaft speed, and the speed absorption ratio begins to increase.

For a given accelerator pedal position in a vehicle having an engine that is isochronously governed, engine speed is inherently constrained essentially to a single speed when the engine is operating in a steady state. Hence, the engine will accelerate when the accelerator pedal is depressed and will settle at a speed corresponding to accelerator pedal position. However, the engine speed that results when the accelerator pedal is depressed to a certain extent may be insufficient to cause the transmission to upshift, in which case, the engine may tend to lug instead of upshifting to a higher gear that would allow continued acceleration of the vehicle to an even higher vehicle speed. Increased engine speed sufficient to cause the transmission to upshift can be obtained only by further depression of the accelerator pedal in an amount sufficient to cause the engine to operate at that increased speed. A driver who is familiar with gasoline-powered vehicles may find the need to further depress the accelerator pedal of such a diesel-powered vehicle objectionable because of the added pedal effort required on his or her part.

A known engine controller that is present in certain vehicles manufactured by the assignee of this invention is premised on isochronous speed regulation and utilizes engine speed as a setpoint that is subsequently processed with additional data for developing a proper fueling command to operate the engine at the corresponding speed. The processor contains programmed data correlating engine speed setpoint data with combinations of accelerator pedal position data and engine load data and processes accelerator pedal position data corresponding to the position of the accelerator pedal and engine load data corresponding to the load on the engine in accordance with that programmed data to develop the engine speed setpoint data. Actual engine speed is an input to a governor PID (proportional, integral, derivative) and engine speed error, meaning the difference between actual engine speed and the engine speed setpoint, is another input to the governor PID. The governor PID processes the inputs to develop output data representing a governed mass fuel input to the engine. The controller subsequently develops a corresponding pulse signal for operating the engine fuel injectors. The governor strategy embodied in that controller is premised on isochronous speed regulation.

SUMMARY OF THE INVENTION

The present invention relates to an improvement to a controller of the type just mentioned for enabling the controller to act like a load governor rather than a speed governor without altering the architecture or the basic strategy embodied in the controller. Rather than rearranging the existing fundamental design architecture, the invention accomplishes load governing by programming the engine speed setpoint data in correlation with combinations of accelerator pedal position data and engine load data in ways that cause engine speed setpoint data to change in ways that when processed by the existing PID governor, result in governed mass fuel input to the engine responding to accelerator pedal position in the manner of a mechanical load governor, rather than a speed governor.

Accordingly, generic aspects of the present invention relate to an engine controller and method for controlling a compression ignition engine that powers a motor vehicle containing an accelerator pedal for accelerating the vehicle, wherein a processor processes various data to develop fueling data for accomplishing governed fueling of the engine. The processor contains programmed engine speed setpoint data representing engine speed setpoints correlated with combinations of accelerator pedal position data and engine load data. The processor processes accelerator pedal position data corresponding to the position of the accelerator pedal and engine load data corresponding to the load on the engine to develop engine speed setpoint data which is further processed with actual engine speed data to develop the fueling data to cause the engine to operate within an envelope of prescribed speed subject to limiting to a maximum speed. The programmed engine speed setpoint data is correlated to the accelerator pedal position data and the engine load data such that the engine speed setpoint data, when processed with actual engine speed data to develop the fueling data, causes the engine to be load governed.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
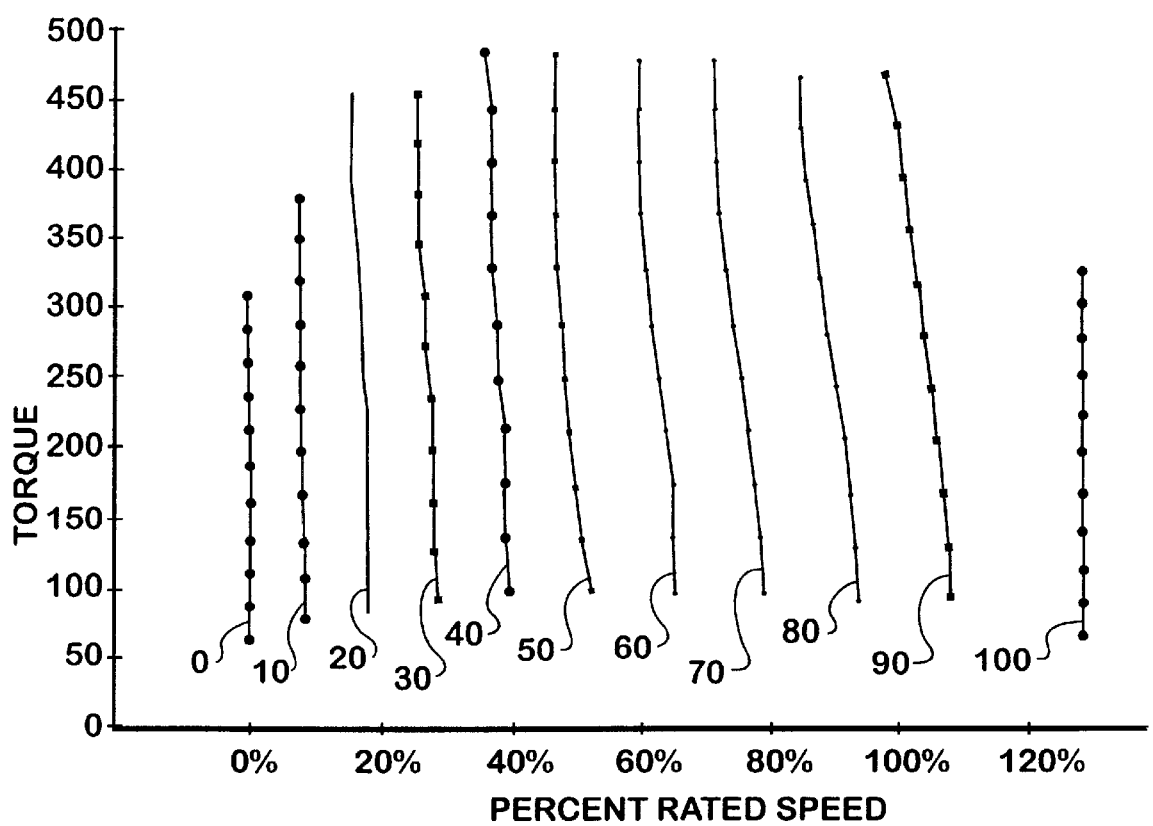
FIG. 1 is a representative graph plot of isochronous governing of a compression ignition engine.

FIG. 1 illustrates isochronous governing of a compression ignition engine in a motor vehicle. The horizontal axis of the graph plot is engine speed measured as a fraction of rated engine speed, and the vertical axis is engine torque measured in pound-feet. Each of the graph plots 0, 10, 20, 30, 40, 50, 60, 70, 80, 90, 100 is a line of regulation corresponding to a like percentage to which an accelerator pedal of the vehicle is being depressed to operate the engine. For example, the graph plot marked 10 represents a 10% depression of the accelerator pedal toward full depression while the one marked 90 corresponds to 90% pedal depression toward full depression. Each graph plot is substantially a vertical line showing engine speed regulation that provides essentially 0% regulation. Any droop present is small. That is, the engine is governed by adjusting the fuel quantity so that steady state engine speed does not change with changes in engine load within the torque envelope of the engine. Some transient engine speed variation may occur but steady state engine speed remains constant for a constant amount of depression of the accelerator pedal.

Figure 2:
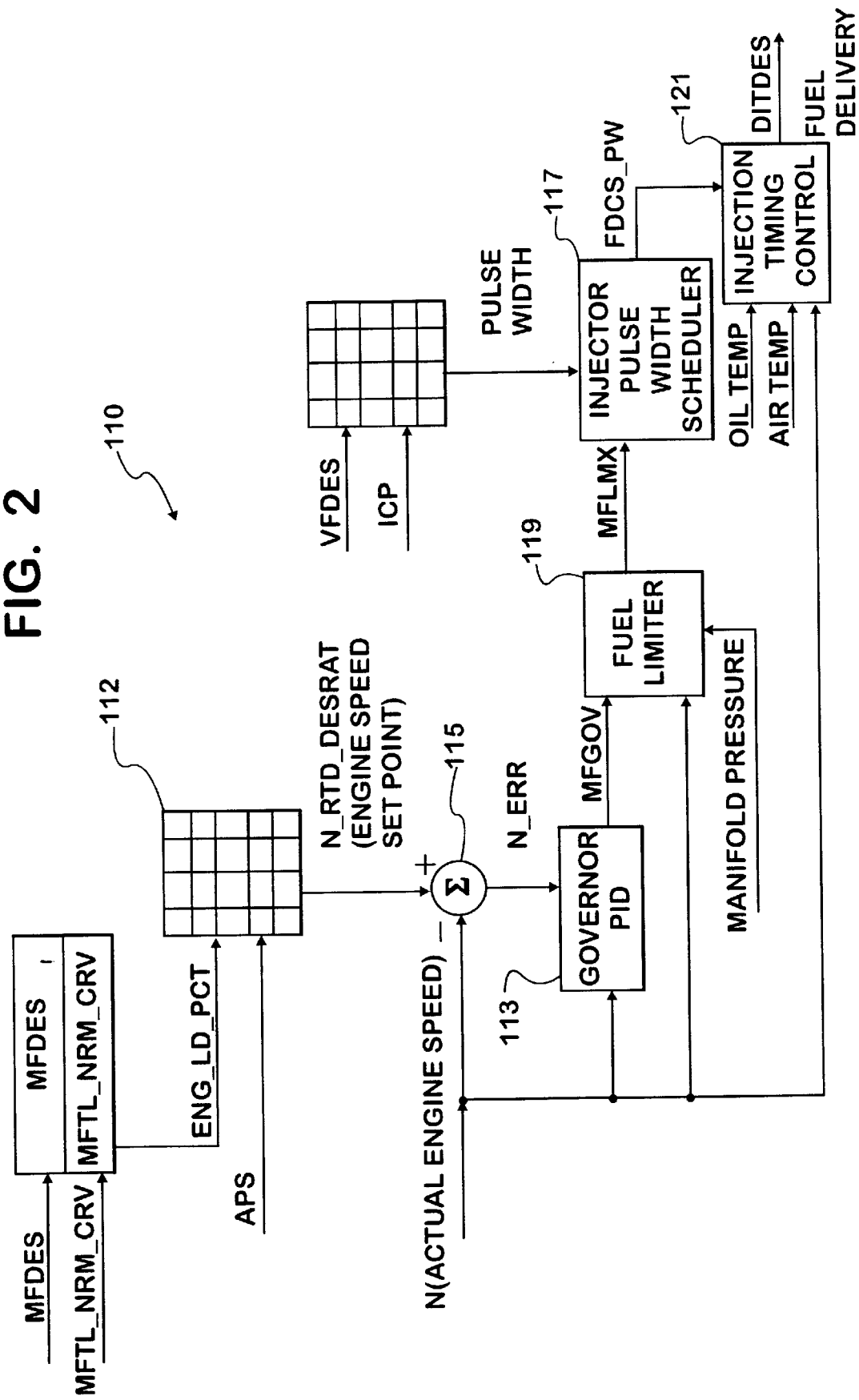
FIG. 2 is a general schematic diagram of a portion of an engine controller relevant to principles of the present invention.

FIG. 2 illustrates a portion of a processor-based engine controller 110 relevant to principles of the invention. A function generator 112 receives two data inputs. An accelerator position sensor provides one data input APS, and the second data input is engine load ENG_LD_PCT, which by way of example is measured as a percentage of rated engine load for whatever the rated load of the particular engine happens to be. Function generator 112 provides a data output N_RTD_DESRAT that represents engine speed setpoint.

Function generator 112 contains programmed engine speed setpoint data in correlation with various combinations of accelerator pedal position data and engine load data over an accelerator pedal position range and an engine load range. The processor processes accelerator pedal position data corresponding to the position of the accelerator pedal and engine load data determined by the ratio of a calculated fuel request to the engine torque limit in accordance with the programmed data of function generator 112 to develop engine speed setpoint data N_RTD_DESRAT. The programmed data in function generator 112 relates accelerator pedal position and engine load, via values of the particular engine speed setpoint data programmed in function generator 112, to cause a governor PID 113 to operate as a load governor. An example of the load governing characteristic is portrayed in FIG. 3.

Figure 3:
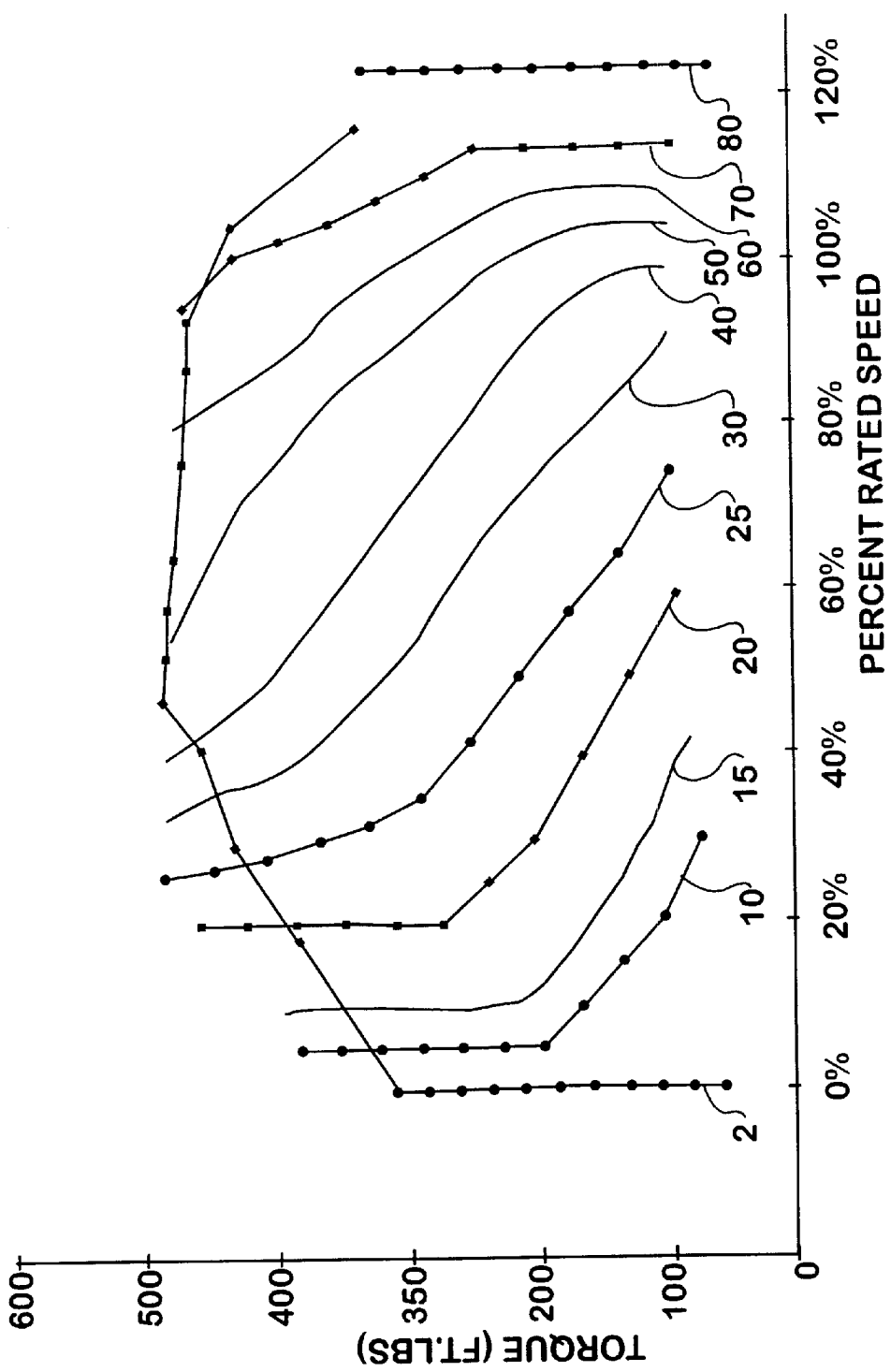
FIG. 3 is a representative graph plot of engine governing provided by the controller of FIG. 2 in accordance with principles of the present invention.

That load governing characteristic may be described in various ways in relation to the parameters of FIG. 3. It may be said that for each of multiple accelerator pedal positions over a majority of the total range of accelerator pedal positions, engine torque is inversely related to engine speed over a majority of the engine torque envelope for each of the different accelerator pedal positions.

Figure 4:
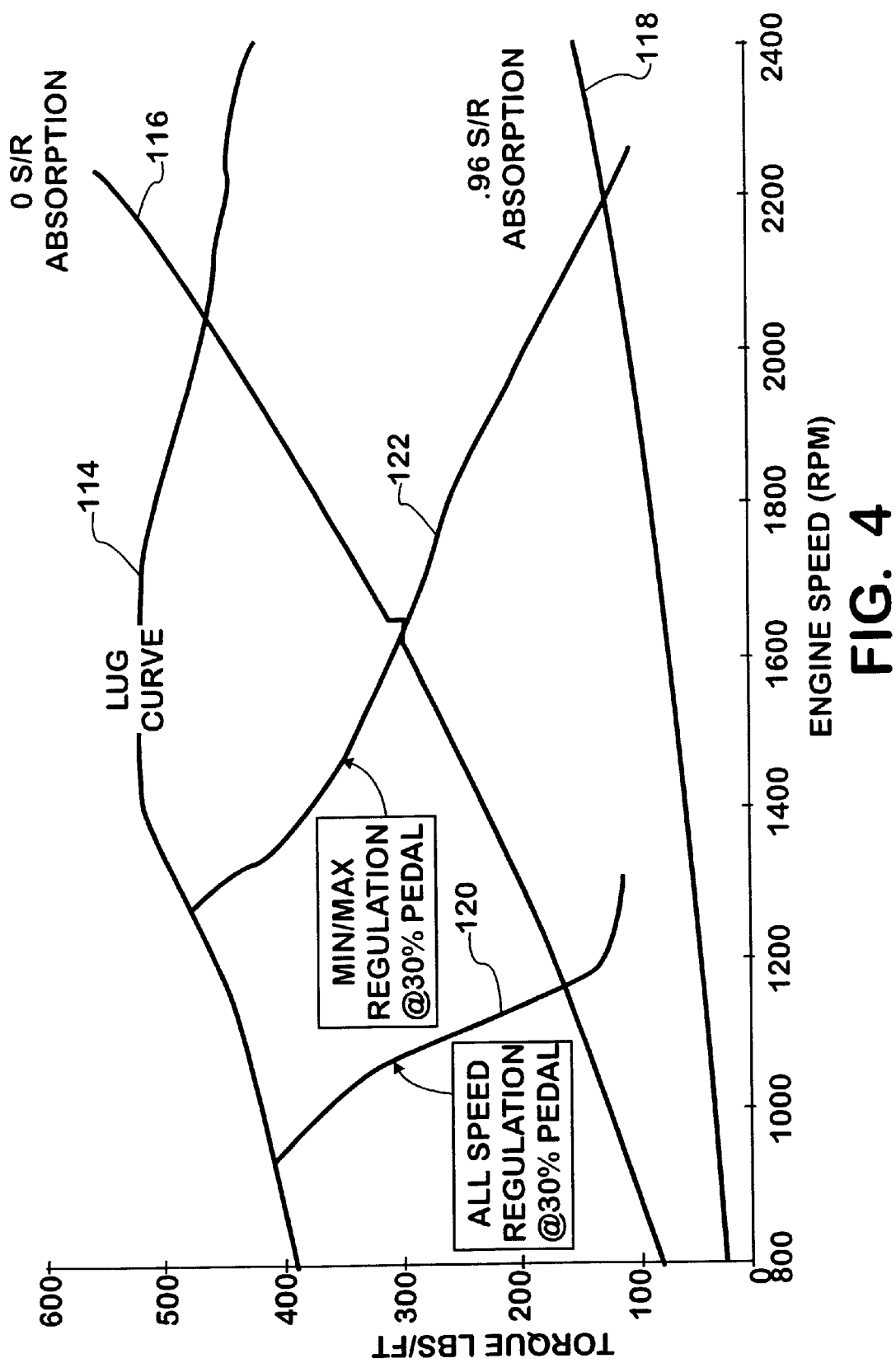
FIG. 4 is a representative comparison graph plot portraying change in engine operation provided by the present invention.

As a result, the engine is governed by a manner graphically portrayed in FIG. 3. Each of the graph plots 2, 10, 15, 20, 25, 30, 40, 50, 60, 70, 80 is a line of regulation corresponding to a like percentage to which the accelerator pedal is being depressed to operate the engine. Unlike the substantially vertical graph plots in FIG. 1, each of the plots in FIG. 3 that represents a respective partial depression of the accelerator pedal has a much wider range of speed regulation, i.e. much more droop. An illustration of the effect of the differences between the governing of FIG. 1 and that of FIG. 3 is shown in FIG. 4.

A line 114 represents what is commonly known as the lug line of the engine. Two additional lines 116, 118 represent two different values for the speed ratio absorption of a particular automatic transmission through which the engine propels the drivetrain of the vehicle. Line 116 represents zero speed ratio absorption while line 118 represents 0.96 speed absorption ratio, or almost 100% speed absorption. A zero speed absorption ratio means that rotation of an input shaft of a torque converter of the automatic transmission is producing no rotation of the torque converter output shaft. A 0.96 speed absorption ratio means that the torque converter output shaft is rotating at 0.96 times the input shaft speed.

Line 120 corresponds to line 30 in FIG. 1 and line 122 to line 30 in FIG. 3. An important point to be noticed is that line 116 crosses line 122 at a substantially higher amount of torque in comparison to the torque at which line 116 crosses line 120. If a vehicle is stopped and the accelerator pedal is depressed 30% in an attempt to accelerate it, substantially more torque is available for conversion to drivetrain torque when the torque converter hooks up to begin converting engine torque to drivetrain torque. The difference in responsiveness results from the difference between the engine speed setpoints processed by governor PID 113 in each instance. A benefit of the increased torque is demonstrated by an example where the lower torque may be unable to accelerate a vehicle that bears a certain load whereas the increased torque can. A driver may consider the vehicle in the latter case more desirably responsive because he or she does not have to depress the accelerator pedal as much to initiate vehicle acceleration. It can be appreciated from the difference in engine speed between lines 120 and 122 throughout their range, that a significant difference also exists between engine speed setpoint data provided from function generator 112 to governor PID 113 in each instance.

Figure 5:
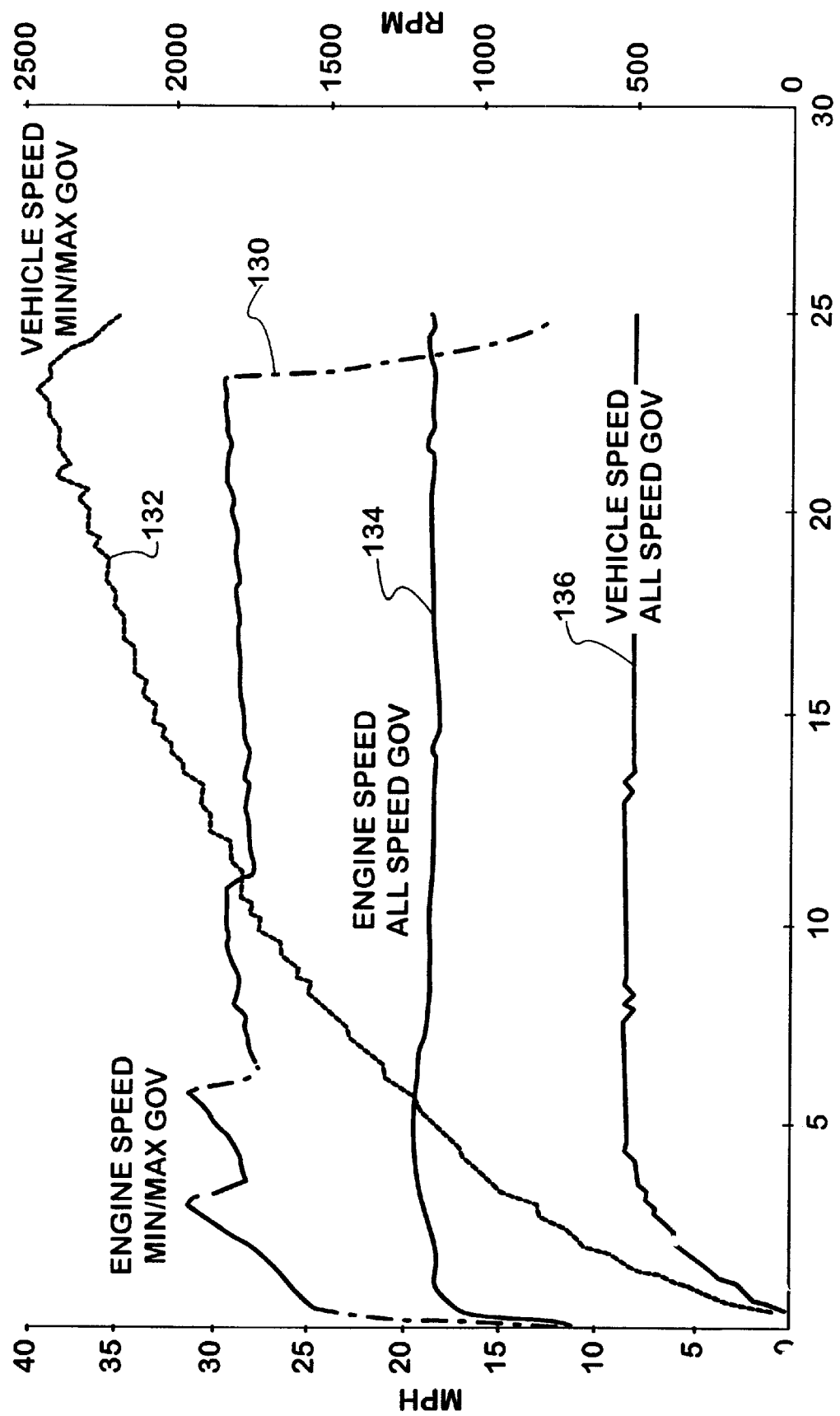
FIG. 5 is a representative comparison graph plot portraying change in vehicle and engine operation provided by the present invention.

FIG. 5 shows the effect of the invention on both engine acceleration and vehicle acceleration when the accelerator pedal is depressed to accelerate the vehicle from zero speed. A line 130 represents engine speed, and a line 132, vehicle speed, as functions of time according to the governing of FIG. 3. A line 134 represents engine speed, and a line 136, vehicle speed, as functions of time according to the governing of FIG. 1. Comparison shows that the FIG. 3 strategy provides three successive upshifts that accelerate the vehicle to a speed in excess of 35 miles per hour. The strategy of FIG. 1 shows no such upshifts because the engine accelerates to a much lower governed speed that is insufficient to cause the transmission torque converter to be effective to shift the transmission to higher gears. Hence, vehicle speed flattens out at somewhat less than 10 miles per hour.

The engine speed setpoint provided by function generator 112 is used to develop engine speed error data. The processor takes the difference between actual engine speed N and the engine speed setpoint from function generator 112 (step 115). Both actual engine speed N and engine speed error are inputs to governor PID 113. Governor PID 113 processes the inputs to develop output data representing governed mass fuel data MFGOV representing engine fueling. The controller processor subsequently processes the governed mass fuel data MFGOV, actual engine speed N, and intake manifold pressure to limit (reference 119) the effect of MFGOV in certain situations where the amount of injected fuel determined by MFGOV would be inappropriate for certain manifold pressures at the current engine speed. Hence the data MFLMX will equal MFGOV, except when being temporarily limited by certain prevailing manifold pressures for the current engine speed. Because the fuel mass is introduced into the engine via electric-operated fuel injectors, the data MFLMX is processed by a pulse width scheduler 117 to develop data defining the proper pulse width for operating the engine fuel injectors. Timing of the pulse is further determined by an injection timing control 121.

While a presently preferred embodiment of the invention has been illustrated and described, it should be appreciated that principles of the invention apply to all embodiments falling within the scope of the following claims.

What is claimed is:

1. An engine controller for controlling a compression ignition engine that powers a motor vehicle containing an accelerator pedal for accelerating the vehicle, the controller comprising:

a processor for processing various data to develop fueling data for accomplishing governed fueling of the engine; wherein the processor contains programmed engine speed setpoint data representing engine speed setpoints correlated with combinations of accelerator pedal position data and engine load data such that the engine speed setpoint data, when processed with actual engine speed data to develop the fueling data, causes the engine to be load governed;

the processor processes accelerator pedal position data corresponding to the position of the accelerator pedal and engine load data corresponding to the load on the engine to develop engine speed setpoint data; and the processor further processes the developed engine speed setpoint data and the actual engine speed data to develop the fueling data to cause the engine to operate within an envelope of prescribed speed subject to limiting to a maximum speed.

2. An engine controller as set forth in claim 1 in which for each of multiple accelerator pedal positions over a majority of the total range of accelerator pedal positions, load governing is characterized by engine torque being inversely related to engine speed over a majority of the range of engine torque for each of the multiple accelerator pedal positions.

3. An engine controller as set forth in claim 1 in which the controller comprises a PID governor that processes actual engine speed data and engine speed error equal to the difference between the engine speed data and the engine speed setpoint data developed from processing accelerator pedal position data corresponding to the position of the accelerator pedal and engine load data corresponding to the load on the engine to develop the fueling data.

4. An engine controller as set forth in claim 3 in which the controller processes data from the PID governor to develop pulse width data for use in determining the duration of pulses applied to fuel injectors that inject fuel into the engine.

5. A method of load governing a compression ignition engine that powers a motor vehicle containing an accelerator pedal for accelerating the vehicle, the method comprising:

processing various data to develop fueling data for accomplishing governed fueling of the engine;

processing accelerator pedal position data corresponding to the position of the accelerator pedal and engine load data corresponding to the load on the engine to develop engine speed setpoint data according to a function generator containing engine speed setpoint data representing engine speed setpoints correlated with combinations of accelerator pedal position data and engine load data for accomplishing load governing of the engine in consequence of further processing of the engine speed setpoint data; and processing the developed engine speed setpoint data and actual engine speed data to develop the fueling data such that the fueling data causes the engine to operate within an envelope of prescribed speed subject to limiting to a maximum speed.

6. A method as set forth in claim 5 in which for each of multiple accelerator pedal positions over a majority of the total range of accelerator pedal positions, load governing is characterized by relating engine torque inversely to engine speed over a majority of the range of engine torque for each of the multiple accelerator pedal positions.

7. A method as set forth in claim 5 including processing, by a PID governor, actual engine speed data and engine speed error equal to the difference between the engine speed data and the engine speed setpoint data resulting from processing accelerator pedal position data corresponding to the position of the accelerator pedal and engine load data corresponding to the load on the engine to develop the fueling data.

8. A method as set forth in claim 7 including processing data from the PID governor to develop pulse width data for use in determining the duration of pulses applied to fuel injectors that inject fuel into the engine.

* * * * *